United States Patent [19]

Hanson et al.

[11] Patent Number: 4,576,532
[45] Date of Patent: Mar. 18, 1986

[54] INSULATION STUD

[75] Inventors: Michael R. Hanson, Tulsa; Frank C. Bryant, Sapulpa, both of Okla.

[73] Assignee: Hanlock, Inc., Tulsa, Okla.

[21] Appl. No.: 711,187

[22] Filed: Mar. 13, 1985

Related U.S. Application Data

[63] Continuation-in-part of Ser. No. 529,559, Sep. 6, 1983, abandoned.

[51] Int. Cl.⁴ .......................... E04B 1/62; F16B 21/04
[52] U.S. Cl. ...................................... 411/352; 24/295; 24/453; 52/506; 52/509; 52/511; 52/512; 110/336; 403/290; 411/508; 411/516
[58] Field of Search .................................. 52/506–513, 52/582, 712, 713, 715, 404, 410; 411/352, 508, 509, 510, 514, 516, 520, 521; 24/293–296, 453, 625; 292/322; 160/356; 403/290; 110/336–339; 248/317

[56] References Cited

U.S. PATENT DOCUMENTS

| | | | |
|---|---|---|---|
| 1,765,053 | 6/1930 | Carr | 52/511 |
| 1,968,168 | 7/1934 | Place | 24/295 X |
| 2,037,682 | 4/1936 | Hall | 52/511 |
| 2,143,605 | 1/1939 | Lombard | 24/453 X |
| 2,392,179 | 1/1946 | Paley et al. | 52/506 |
| 2,548,838 | 4/1951 | Gillespie | 24/453 |
| 2,697,857 | 12/1954 | Eckel | 52/506 |
| 3,986,314 | 10/1976 | Moeller | 52/715 X |

FOREIGN PATENT DOCUMENTS

WO80/00162  2/1980  PCT Int'l Appl. .................. 52/506

Primary Examiner—Donald G. Kelly
Attorney, Agent, or Firm—William S. Dorman

[57] ABSTRACT

A retainer assembly for securing a sheet-like material to a wall comprising an elongated stud having an inner end welded to the wall and extending outwardly therefrom so as to be perpendicular to the wall, the stud having a pointed outer end whereby the sheet-like material can be impaled thereon and positioned so as to be adjacent the wall, the stud being provided with a longitudinal slit extending from the outer pointed end to a location adjacent the inner end so as to form a pair of longitudinal fingers, the stud being bent adjacent the inner end whereby the fingers are laterally offset from each other, the fingers being provided with alternate outwardly extending teeth and recessed notches along the longitudinal sides of the fingers opposite from the slit, and a retainer plate provided with a central opening therein such that the pointed end of the stud can be inserted through the opening to permit the plate to be slidably received on the stud, the opening in the plate being approximately equal to the distance between the notch on one finger and an opposed notch on the other finger, whereby, when the plate is urged in a direction from the pointed end of the stud towards the inner end thereof, the fingers will move in a scissors fashion as the plate passes over the teeth on the fingers, and whereby, when the plate comes to rest in a desired position in a pair of opposed notches on the fingers, the fingers will spring back towards their original disposition to lock the plate in the desired position.

12 Claims, 17 Drawing Figures

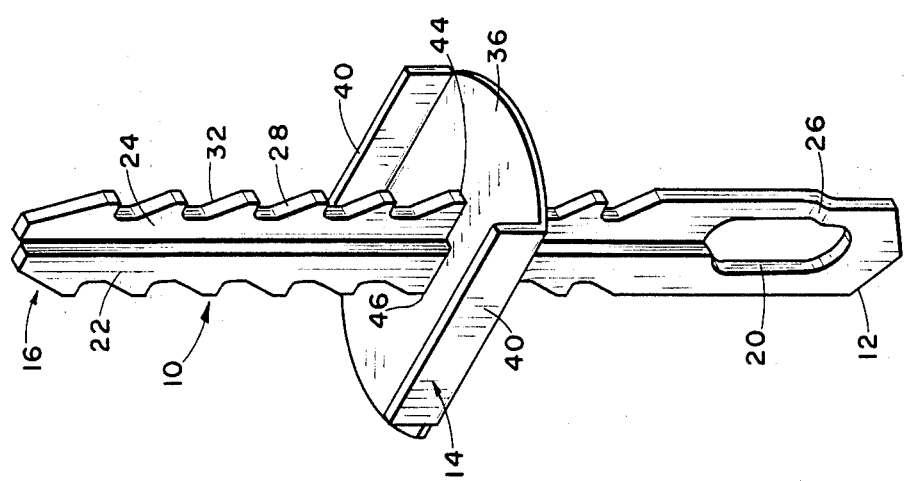
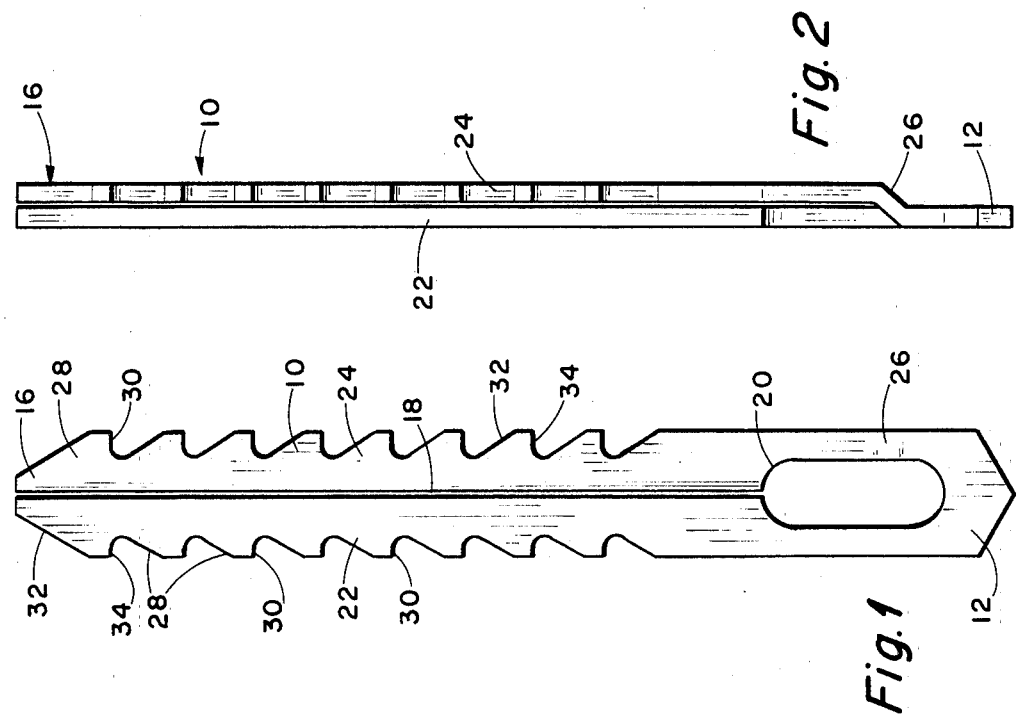

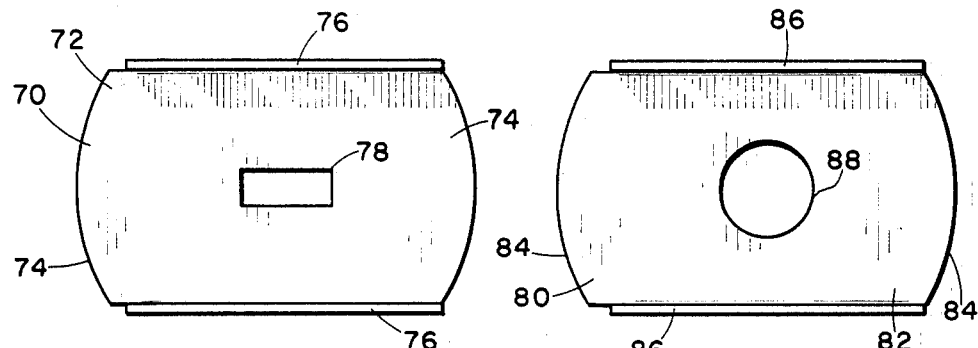
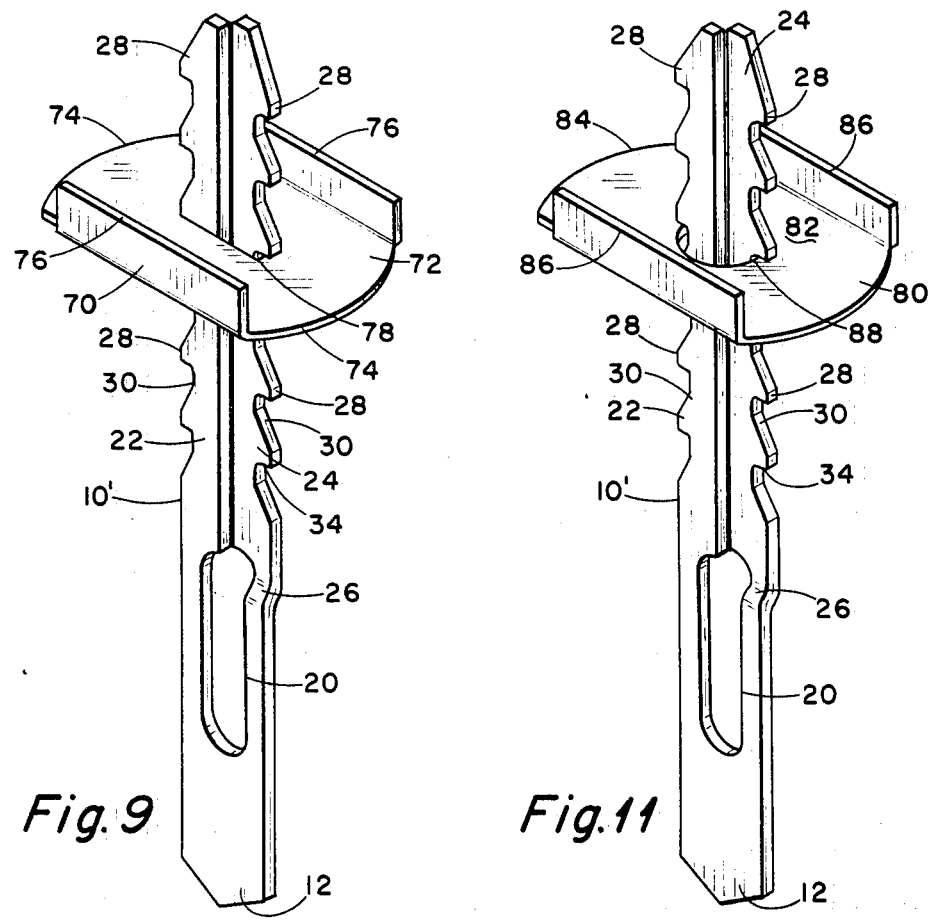

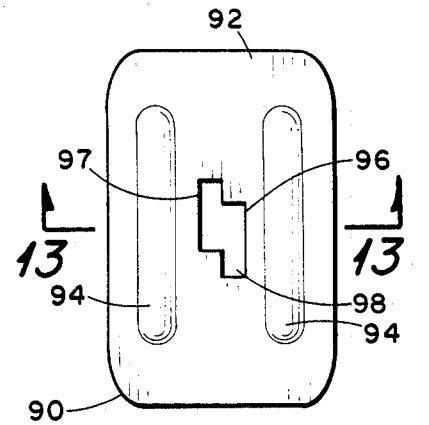
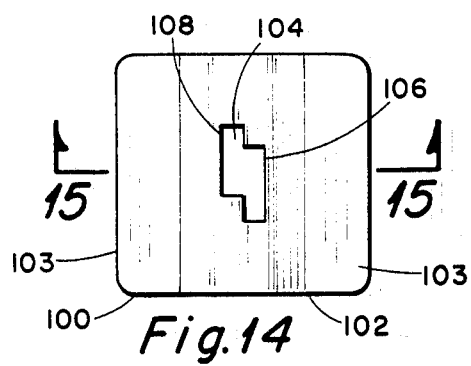
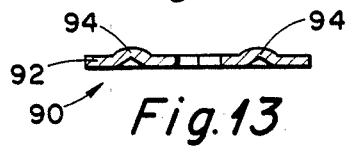
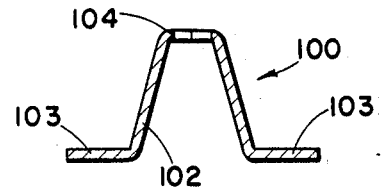
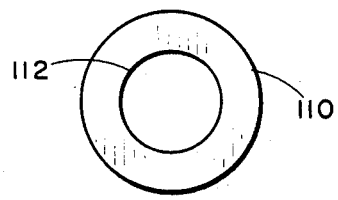
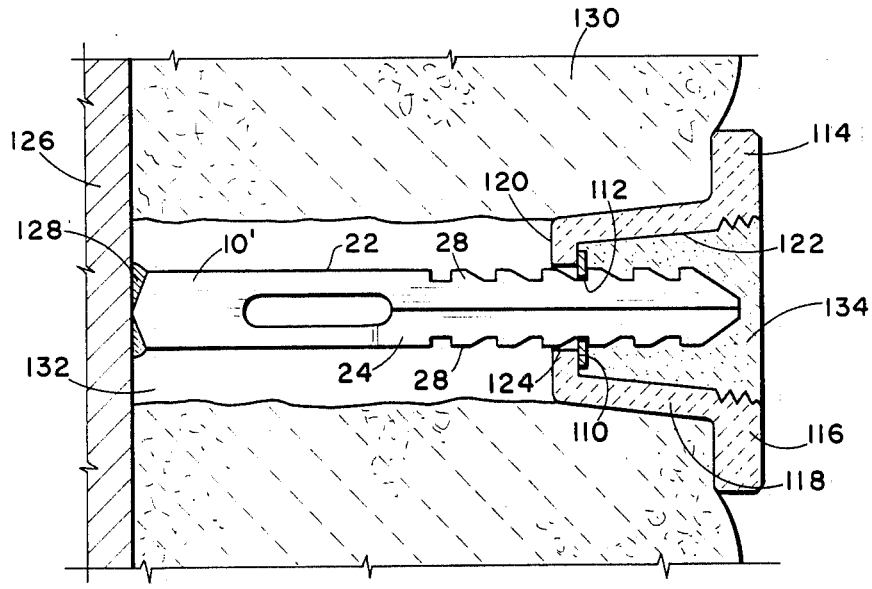

INSULATION STUD

CROSS-REFERENCE TO RELATED APPLICATION

The present application is a continuation-in-part of our prior copending application Ser. No. 06/529,559 filed Sept. 6. 1983, now abandoned.

BACKGROUND OF THE INVENTION

1. Field of the Invention

The present invention relates to a hanger or retainer assembly for securing relatively thick panel-like or sheet-like insulation material to a structure such as the refractory walls of a furnace. More particularly, the present invention relates an improved insulation stud for this retainer assembly. The insulation stud of the present invention is in the form of a bifurcated stud whose resulting fingers operate in scissors fashion to secure a retaining clip thereon.

2. Prior Art

It is common practice to line the refractory walls of a furnace with insulation material, generally in the form of thick panels, blankets or sheets, to protect the walls from the high temperature generated by the furnace. It is necessary to employ some type of device to anchor or secure the insulation material to the walls. During the course of time, it is also necessary to remove the old insulation material and reline the furnace, as the material will deteriorate during use.

Walker, U.S. Pat. No. 3,738,217 shows an insulation hanger in the form of an elongated stud having alternate teeth and notches along the narrow sides of the stud and a retaining clip or washer having a central rectangular opening therein. In order to secure the clip to the stud, after impaling insulation material thereon, it is necessary to push the washer or clip to the desired location and then rotate the clip 90 degrees. After the furnace has been in use for a period of time, the clip will sometimes fall off the stud.

SUMMARY OF THE INVENTION

The present invention involves a hanger or retainer assembly for securing relatively thick panel-like or sheet-like insulation material to the walls of a furnace. More particularly, the present invention involves an elongated and bifurcated stud which is formed by a longitudinal slit extending from the outer pointed tip of the stud to a location spaced from the opposite end of the stud which is to be welded to the furnace. Thus, the longitudinal slit on the stud forms two elongated fingers. These two fingers are laterally offset from each other for a reason which will hereinafter appear. The narrow outer side edges of the fingers are provided with alternate teeth and notches. One form of a retainer clip is provided having a thin flat base portion and a pair of opposite side edges bent at right angles to the base. This clip, sometimes also referred to as a retainer plate or washer, has a central opening in the form of a pair of offset and overlapping rectangular openings. When the retainer plate is inserted over the pointed end of the stud and pushed downwardly or inwardly thereon towards the welded end of the stud, the teeth of the fingers will engage the outer ends of the interconnected rectangular openings such that the fingers are bent towards each other in scissors fashion. When the retainer plate has been pushed to the desired location, it will come to rest opposite a pair of notches, at which time the fingers will spring back into their original solution to hold the retainer plate securely in place. In a preferred embodiment of the invention this offset condition is created by a bend at the lower end of one finger only and in the area of an oval opening provided adjacent the inner or welded end of the stud. This oval opening also serves to improve the bending of the fingers to facilitate the scissors action. In an alternate form of the invention, the offset condition of the fingers is accomplished by putting bends adjacent the bottoms of both fingers.

There are two different modifications of the retainer plate with certain variations on these two different embodiments. Basically, however, these two additional embodiments differ from the retainer plate described above in that one embodiment has a circular opening and the other has rectangular opening.

BRIEF DESCRIPTION OF THE DRAWINGS

FIG. 1 is a front elevation of an insulation stud constructed in accordance with the present invention;

FIG. 2 is a side elevation of the insulation stud shown in FIG. 1;

FIG. 5 is a perspective view of the retainer plate of FIG. 3 placed upon the insulation stud of FIG. 1;

FIG. 8 is a view similar to FIG. 3 but showing a modified form of retainer plate;

FIG. 9 is a view similar to FIG. 3 showing a still further modified form retainer plate;

FIG. 10 is a view similar to FIG. 5 showing a somewhat modified form of insulation stud employed with the retainer plate of FIG. 8;

FIG. 11 is a view similar to FIG. 5 showing a somewhat modified form of insulation stud employed with the retainer plate of FIG. 10;

FIG. 12 is a top plan view of a retainer plate similar to that shown in FIG. 3 with the side members removed but with ridges in the plate itself;

FIG. 13 is a cross-sectional view taken along section line 13—13 of FIG. 12;

FIG. 14 is a top plan view of a retainer clip broadly similar to that shown in FIG. 3 but having an inverted U-shaped cross section with horizontal ears projecting outwardly;

FIG. 16 is a top plan view of a modified form of the retainer plate shown in FIG. 10 in form of a circular washer; and FIG. 17 is a partial cross-section view of an insulation stud of the present invention employed with the washer of FIG. 16 in conjunction a hollow ceramic cup and showing the assembly holding a portion of a ceramic blanket against the furnace wall.

DETAILED DESCRIPTION OF THE PREFERRED EMBODIMENTS

Figure 6:
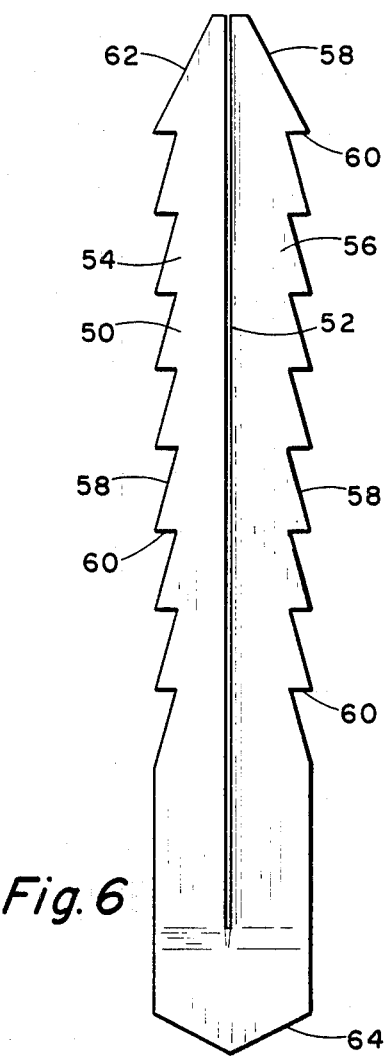
FIG. 6 is a front elevation of a modified form of insulation stud.

Referring to the drawings in detail, FIGS. 1, 2 and 5 show an insulation stud 10 which represents a preferred embodiment of the invention. This stud 10 is generally rectangular in cross-section (except as more particularly described below) with a width several times greater than its thickness. As indicated above, this insulation stud is adapted to be welded at its lower end 12 to the wall of a furnace (not shown). The stud would project outwardly from the furnace substantially at right angles thereto so that insulation material (not shown) can be impaled on the stud. Immediately thereafter, a retainer plate 14 (later to be described in greater detail) can be placed over the pointed outer end or tip 16 of the stud and pushed downwardly or inwardly towards the welded end 12 to hold the insulation material, or blanket, securely on the stud.

The stud 10 is bifurcated by virtue of a longitudinal slit 18 which extends from the tip 16 downwardly to an oval shaped opening 20 above the bottom 12. Furthermore, the resulting two sections or fingers 22 and 24 of the stud on opposite sides of the slit 18 are offset from each other as best shown in FIG. 2. This offset is provided by a double bend 26 which is located at the bottom of the section or finger 24 adjacent the bottom 12 of the stud 10. Thus, the cross-sectional shape of the stud 20 (except for the lower end thereof) is not truly rectangular, but is in the shape of a split rectangle, resulting in two contiguous offset rectangles. These two offset rectangles would be of greater length across the teeth 28 and would be of shorter length across the notches 30, as long section line A—A, as is represented by the approximate shape of the central opening in the washer, later to be described. The bend 26 is also positioned to one side of the oval opening 20.

The sides of the fingers 22 and 24 are provided with alternate teeth 28 and notches 30 along the narrow edges of the fingers. The teeth are formed by downwardly and outwardly inclined edges 32 and the notches are provided by shoulders 34 which extend inwardly at right angles to the longitudinally central axis of the stud 20 below the inclined edges 32.

Figure 3:
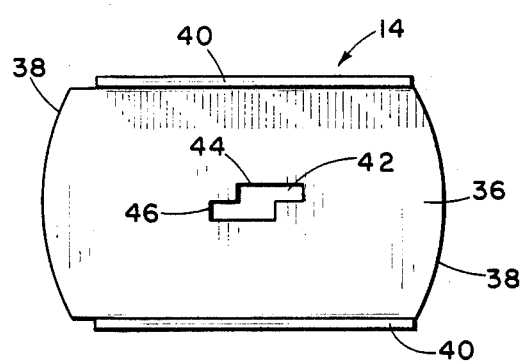
FIG. 3 is a top plan view of a retainer plate to be used in conjunction with the insulation stud of FIG. 1.
Figure 4:
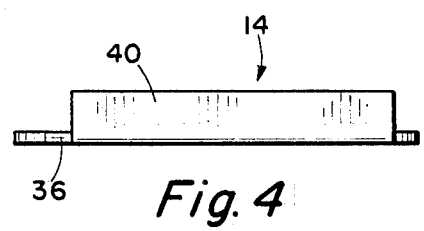
FIG. 4 is a front view of the retainer plate shown in FIG. 3.

The retainer plate 14 which is shown in FIGS. 3, 4 and 5 is provided with a relatively thin flat base portion 36 which is rounded at the ends 38 and which has a pair of integral side members 40 that extend upwardly from the base 36 at right angles thereto. The sides 40 permit a person to grasp the retainer plate 14 with ease and to insert the same over the tip 16 of the stud 10. These sides 40 also add to the structural rigidity of the retainer plate 14. Finally, the retainer plate 14 is provided with a central opening 42 which essentially corresponds with the cross-sectional shape of the stud 10 in the area of the notches such as along the line A—A on FIG. 2. More particularly, this opening 42 can be defined in terms of an upper rectangular opening 44 which is offset from a lower rectangular opening 46 as best shown in FIG. 3. Actually, the rectangular openings 44 and 46 are somewhat longer, in the horizontal dimension (in relation to FIG. 3) than the horizontal dimensions of the fingers in the area of the notches; in the true cross-sectional shape of the stud itself, the rectangles would not overlap but would merely touch at their inner corners. The overlapping relationship of the rectangular openings 44 and 46, as shown in FIG. 3, is to provide space for the inner edges of the fingers to move in scissors fashion as the retainer plate 14 moves past the maximum dimensions of the teeth 28. the maximum dimension of the opening across the opposite end of the rectangular openings 44 and 46 is approximately equal to the distance between the notch 30 or finger 22 and the opposite notch on finger 24 immediately below the shoulders 34. When the retainer plate 14 is placed over the stud 10 as shown in FIG. 5, the rectangular portion 44 of the opening 42 will receive the finger 24, whereas the rectangular portion 46 will receive the finger 22. Of course, the opening 42 is symmetrical such that the retainer plate 14 can be turned 180 degrees so that the rectangular portion 46 can be received over the finger 28, etc.

By virtue of the longitudinal slit 18 and the offset relation of the fingers 22 and 24, as best shown in FIG. 2, the two fingers will behave as scissors as the clip 36 is pushed onto the stud 10. That is, the inclined portions 32 (of the teeth 28) will engage the outer ends of the portions 44 and 46 of the slot 42 and force the two fingers 22 and 24 towards each other in the manner of a pair of scissors such that the fingers will actually overlie one another somewhat along their edges adjacent the slit 18 as the clip is pushed from one tooth to another. When the retainer plate comes to rest in a pair of notches on the fingers 22 and 24, the fingers will spring back to the positions shown in FIG. 1 and the clip will be held securely in place. As a result of the shape of the opening 42 and the cross-sectional shape of the stud 10, when the retainer plate 14 is seated in a pair of opposed notches 30, it will be virtually impossible to turn or rotate the retainer clip, and, hence, it will not fall off the stud even after a prolonged use of the furnace as is otherwise the case in use of the stud and washer of the aforementioned Walker patent.

The oval opening 20 facilitates the scissors function; i.e., because there is a smaller amount of metal on the fingers 22 and 24 on opposite sides of the opening 20, the bending of the fingers 22 and 24 becomes easier.

Figure 7:
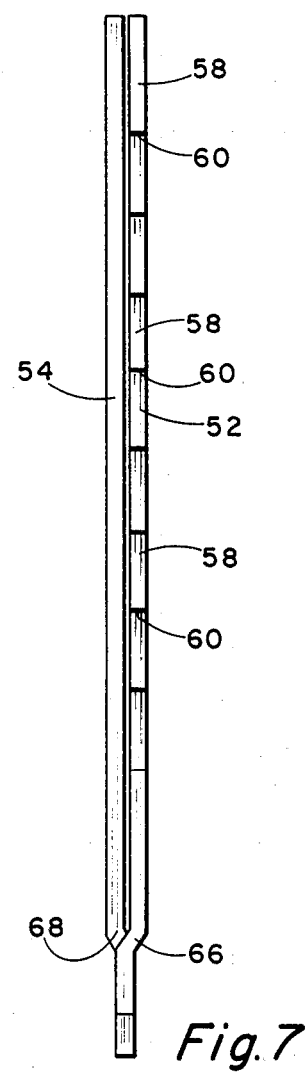
FIG. 7 is a side view of the insulation stud shown in FIG. 6.

FIGS. 6 and 7 represent an alternate embodiment of the present invention. In these figures, a stud 50 is provided having a longitudinal slit 52 resulting in fingers 54 and 56. The sides of the fingers are provided with alternate teeth 58 and notches 60 in similar fashion to the stud 10 described in FIGS. 1 and 2. This stud 50 has an upper tip 62 and a lower end 64 which permits welding to the surface of a furnace (not shown). Instead of having one double bend on one finger body, as in the case of FIGS. 1 and 2, the stud 50 of FIGS. 6 and 7 is provided with two double bends 66 and 68 adjacent the bottoms of the two fingers 52 and 54, respectively. The retainer plate 14 of FIGS. 3 and 4 can be placed over the stud 50 of FIGS. 6 and 7 in the same manner as previously described and the fingers 50 and 52 will behave in a scissors fashion as the retainer plate is pushed downwardly or inwardly along the stud 50 towards the end 64.

Referring now to FIGS. 8 and 9, FIG. 8 shows a modified form of retainer plate 70 which is provided with a relatively thin flat base portion 72 rounded at the ends 74 and which has a pair of integral side members 76 which extend upwardly from the base 72 at right angles thereto. The base 72, the rounded ends 74 and the side members 40 correspond with the base portion 36, the rounded ends 38 and the integral side members 40, respectively, shown on the retainer plate 14 in FIGS. 3, 4 and 5. However, the retainer plate of FIG. 8 is provided with an opening 78 which is rectangular in shape. This singular rectangular shape of the opening 78 is to be contrasted with the opening 42 in the retainer plate 14 of FIG. 3 in that the opening 42 is defined by a pair of off-set interconnecting rectangular openings 44 and 46. Opening 78 has a width corresponding to twice the thickness of one of the fingers 22 or 24 or, in other words, equal to the thickness of the two fingers when they are in the off-set position as shown in FIGS. 2 and 7. The horizontal length of the opening 78, as it appears in FIG. 8, would be equal to the distance of a notch 30 on one of the fingers to the notch 30 on the opposite finger at a position directly beneath the shoulders 34. Thus, when the retainer plate 70 is forced over the top of the stud and pushed downwardly or inwardly towards the base of the stud, the fingers will move in scissor fashion until the retainer plate 70 is pushed into the desired position. When the opening 78 underlies a pair of shoulders 34, the fingers will spring outwardly and the retainer plate 70 will be locked securely in place. The insulation stud 10' is slightly modified from the insulation stud 10 shown in FIGS. 1 and 2 in that the opening 20 is spaced slightly above the base 12 and is somewhat longer than that shown in FIG. 1; also the double bend 26 is located adjacent the outer end of the opening end 26. The insulation 10' is otherwise the same as the insulation stud 10 shown in FIGS. 1 and 2.

FIG. 10 shows retainer plate 80 which is generally similar to the retainer plate 14 shown in FIG. 3 and the retainer plate 70 shown in FIG. 8. This retainer plate is provided with a base 82, curved ends 84 and side members 86 which correspond with base 72, curved edges 74 and side members 76, respectively, shown in FIG. 8. However, the retainer plate 80 of FIG. 10 is provided with a circular opening 88 whose diameter is essentially equal to the distance from one of the notches 30 of one of the fingers to the notch 30 on the opposed finger at a position directly beneath the shoulders 34. Thus, when the retainer plate 80 is inserted over the stud 10', as shown in FIG. 11, and the retainer plate 80 is moved downwardly or inwardly towards the base 12 of the stud 10', the fingers 22 and 24 will move in a scissors fashion as the opening 88 passes over the teeth 28. When the retainer 80 is pushed inwardly to the desired position, pressure is removed from the retainer plate 80 and the fingers 22 and 24 will spring outwardly such that the opening 88 will be positioned in a pair of opposed notches 30 below the shoulders 34.

Turning now to FIGS. 12 and 13, these figures show a retainer plate 90 which is broadly similar to the retainer plate shown in FIG. 3 except that there are no side members such as the side members 40 shown in FIG. 3. Instead, the retainer plate 90 is provided with a single virtually flat base 92 with a pair of ridges 94 provided therein. The retainer plate 90 is provided with a central opening 96 composed of a pair of off-set rectangular openings 97 and 98 which correspond with off-set rectangular openings 44 and 46 of FIG. 3.

Turning now to FIGS. 14 and 15, a retainer plate or element 100 is provided having a generally U-shaped cross section 102 with a pair of horizontal ears 103. The retainer plate 100 of FIGS. 14 and 15 is provided with a central opening 104 (at the top of the inverted "U") composed of a pair of off-set rectangular openings 106 and 108 which correspond with the rectangular openings 44 and 46 of the washer 14 shown in FIG. 3.

The two retainer plates shown in the two embodiments of FIGS. 12 through 15 inclusive would be placed over the insulation stud 10 in the same manner as the retainer plate 14 described previously in relation to FIGS. 3 and 5.

Turning now to FIGS. 16 and 17, FIG. 16 shows a flat circular washer 110 having a central circular opening 112 therein. The retainer plate or washer 110 of FIG. 16 would have a thickness corresponding to the thickness of the bases 36, 72 or 82 of the washers shown in FIGS. 3, 8 and 10, respectively. If desired the thickness of this washer 110 could be slightly greater. In any event, the opening 112 is the same size as the opening 88 of the retainer plate 80 shown in FIG. 10. That is, the diameter of the opening 112 is equal to the distance between a notch 30 on one finger to the opposite notch 30 on the opposing finger as this distance would be measured underneath the shoulders 34. Preferably the washer 110 is used in conjunction with a ceramic cup 114 which is shown only in cross section of FIG. 17. However the ceramic cup 114 is provided with a circular base 116 and a downwardly or inwardly projecting conical portion 118 terminating in a flat end 120 which is also circular in shape. The inner portion of the cup 114 is provided with a hollow interior 122 and the flat end 120 is provided with a rectangular opening 124 which would be similar in size and shape to the opening 78 in the retainer plate 70.

FIG. 17 shows a stud 10' welded to a portion 126 of a furnace wall (the remaining details of which are not shown). The stud 10' is attached to the furnace wall 126 by means of welding 128. A ceramic blanket 130 is shown as being placed against the wall 126. The blanket 130 is provided with an opening 132 surrounding the insulation stud 10'. The size of the opening 132 is exaggerated for the purpose of illustration. The ceramic cup is pushed over the protruding end of the stud 10' and a washer 110 is pushed over the end of the stud 10' into the cavity 122 in the ceramic cup 114 by means of any hollow tool whose inner dimension can accommodate the stud 10' and whose outer dimension is capable of pushing against the flat surface of the washer 110 to urge it inwardly over the teeth 28 of the fingers 22 and 24 and at the same time against the bottom of the flat end 120 of the ceramic cup 114. When the washer 110 has been pushed inwardly to the desired position, the tool (not shown) is removed and the conical cavity 122 is filled with a ceramic cement 134. As in the case of the retainer plates previously described, the washer 110 would be positioned in a pair of opposed notches 30 immediately behind a pair of opposed shoulders 34. The ceramic cement 134 will, of course, dry and harden and the tip of the stud 10' will be protected from the heat of the furnace.

Whereas the present invention has been described in relation to the drawings attached hereto, it should be understood that other and further modifications, apart from those shown or suggested herein, my be made within the spirit and scope of this invention.

What is claimed is:

1. A retainer assembly for securing a sheet-like material to a wall comprising an elongated stud having an inner end adapted to be welded to said wall and extending outwardly therefrom so as to be perpendicular to said wall, said stud having a pointed outer end whereby said sheet-like material can be impaled thereon and positioned so as to be adjacent said wall, said stud being provided with a longitudinal slit extending from the outer pointed end to a location adjacent the inner end so as to form a pair of longitudinal fingers, said stud being bent adjacent said location whereby said fingers are laterally offset from each other, said fingers being provided with alternate outwardly extending teeth and recessed notches along the longitudinal sides of the fingers opposite from said slit, and a thin flat plate provided with a central opening therein such that the pointed end of said stud can be inserted through said central opening to permit the plate to be slidably received on said stud, said central opening in said plate being formed by a pair of rectangular openings laterally offset with respect to each other and overlapping, the maximum dimension of the opening across the opposite ends of the rectangular openings being approximately equal to the distance between the notch on one finger and an opposed notch on the other finger, whereby, when said plate is urged in a direction from the pointed end of the stud towards the inner end thereof, said fingers will move in a scissors fashion as the plate passes over the teeth on the fingers, and whereby, when the plate comes to rest in a desired position in a pair of opposed notches on the fingers, the fingers will spring back towards their original disposition to lock the plate in the desired position.

2. A retainer assembly as set forth in claim 1 wherein the stud is bent in one finger only and an oval opening is provided in the stud in the region of the bend to facilitate the scissor action of the fingers.

3. A retainer assembly as set forth in claim 2 wherein the stud is bent by providing two oppositely directed bends, one in each finger.

4. A retainer assembly for securing a sheet-like material to a wall as set forth in claim 1 wherein said retainer plate is provided with a pair of integral side members that extend upwardly from the base at right angles thereto to permit the grasping of the retainer plate for facilitating the insertion of the same over the tip of the stud.

5. A retainer assembly for securing a sheet-like material to a wall as set forth in claim 1 wherein said retainer plate is provided with a single virtually flat base with a pair of ridges therein.

6. A retainer assembly for securing a sheet-like material to a wall comprising an elongated stud having an inner end adapted to be welded to said wall and extending outwardly therefrom so as to be perpendicular to said wall, said stud having a pointed outer end whereby said sheet-like material can be impaled thereon and positioned so as to be adjacent said wall, said stud being provided with a longitudinal slit extending from the outer pointed end to a location adjacent the inner end so as to form a pair of longitudinal fingers, said stud being bent adjacent said location whereby said fingers are laterally offset from each other, said fingers being provided with alternate outwardly extending teeth and recessed notches along the longitudinal sides of the fingers opposite from said slit, and a retainer plate provided with a central opening therein such that the pointed end of said stud can be inserted through said opening to permit the plate to be slidably received on said stud, said opening in said plate being approximately equal to the distance between the notch on one finger and an opposed notch on the other finger, whereby, when said plate is urged in a direction from the pointed end of the stud towards the inner end thereof, said fingers will move in a scissors fashion as the plate passes over the teeth on the fingers, and whereby, when the plate comes to rest in a desired position in a pair of opposed notches on the fingers, the fingers will spring back towards their original disposition to lock the plate in the desired position.

7. A retainer assembly for securing a sheet-like material to a wall as set forth in claim 6 wherein said retainer plate has a generally U-shaped cross section with a pair of horizontal ears and a central opening at the top of the inverted "U", said central opening being formed by a pair of rectangular openings laterally offset with respect to each other and overlapping, the maximum, dimension of the opening across the opposite ends of the rectangular openings being approximately equal to the distance between the notch on one finger and an opposed notch on the other finger.

8. A retainer assembly for securing a sheet-like material to a wall as set forth in claim 6 wherein said retainer plate is provided with an opening which is rectangular in shape.

9. A retainer assembly for securing a sheet-like material to a wall as set forth in claim 8 wherein said retainer plate is provided with a pair of integral side members that extend upwardly therefrom at right angles thereto to permit the grasping of the retainer plate for facilitating the insertion of the same over the tip of the stud.

10. A retainer assembly for securing a sheet-like material to a wall as set forth in claim 6 wherein said retainer plate is provided with an opening which is circular in shape.

11. A retainer assembly for securing a sheet-like material to a wall as set forth in claim 10 wherein said retainer plate is provided with a pair of integral side members that extend upwardly therefrom at right angles thereto to permit the grasping of the retainer plate for facilitating the insertion of the same over the tip of the stud.

12. A retainer assembly for securing a sheet-like material to a wall as set forth in claim 10 wherein said retainer plate is in the form of a flat circular washer.

* * * * *